(12) United States Patent
Singh et al.

(10) Patent No.: US 11,719,203 B2
(45) Date of Patent: Aug. 8, 2023

(54) SYSTEM AND METHOD FOR CLEANING AN AIR INTAKE SCREEN OF A WORK VEHICLE

(71) Applicant: CNH Industrial America LLC, New Holland, PA (US)

(72) Inventors: Samrendra Singh, Bolingbrook, IL (US); Kaushal Ghorpade, Chicago, IL (US); Luca Levato, Modena (IT); Hesam Abbassi, Birmingham, MI (US); Panos Tamamidis, Mount Prospect, IL (US)

(73) Assignee: CNH Industrial America LLC, New Holland, PA (US)

( * ) Notice: Subject to any disclaimer, the term of this patent is extended or adjusted under 35 U.S.C. 154(b) by 551 days.

(21) Appl. No.: 16/782,687

(22) Filed: Feb. 5, 2020

(65) Prior Publication Data

US 2021/0239076 A1    Aug. 5, 2021

(51) Int. Cl.
| | | |
|---|---|---|
| *B01D 46/71* | (2022.01) | |
| *B08B 3/02* | (2006.01) | |
| *B08B 5/02* | (2006.01) | |
| *F02M 35/02* | (2006.01) | |
| *F02M 35/08* | (2006.01) | |

(52) U.S. Cl.
CPC ...... *F02M 35/086* (2013.01); *F02M 35/0205* (2013.01); *F02M 35/0216* (2013.01); *B01D 46/71* (2022.01); *B08B 5/02* (2013.01)

(58) Field of Classification Search
CPC ...... B01D 46/0068; B01D 46/71; B08B 3/02; B08B 5/02; F02M 35/086; F02M 35/0216; F02M 35/0205

USPC ............................ 55/302, 385.3; 95/280
See application file for complete search history.

(56) References Cited

U.S. PATENT DOCUMENTS

| | | | |
|---|---|---|---|
| 3,344,854 | A | 10/1967 | Boyajian |
| 3,972,700 | A | 8/1976 | Gleockler et al. |
| 4,047,912 | A | 9/1977 | Markland |
| 4,299,603 | A | 11/1981 | Friesen |
| 4,439,218 | A | 3/1984 | Priepke et al. |
| 4,874,411 | A | 10/1989 | Snauwaert et al. |
| 5,466,189 | A * | 11/1995 | Deutsch .............. F01P 11/12 460/119 |
| 6,192,901 | B1 | 2/2001 | Rome et al. |
| 6,217,638 | B1 | 4/2001 | Van De Velde |
| 7,418,997 | B2 | 9/2008 | Martin et al. |
| 7,998,245 | B2 | 8/2011 | Demonie et al. |
| 8,276,650 | B2 | 10/2012 | Martin et al. |

(Continued)

FOREIGN PATENT DOCUMENTS

DE         10103139         7/2002

*Primary Examiner* — Minh Chau T Pham
(74) *Attorney, Agent, or Firm* — Rickard Demille; Rebecca Henkel

(57) ABSTRACT

A system for cleaning an air intake screen of a work vehicle may include an engine air intake assembly having an air intake screen through which an airflow is directed for subsequent delivery to an engine of a work vehicle. The system may further include a nozzle provided in operative association with the engine air intake assembly and directed towards the air intake screen. Additionally, the system may include a pressurized fluid source configured to supply pressurized fluid to the nozzle. The pressurized fluid received by the nozzle is expelled from the nozzle and directed through the air intake screen.

20 Claims, 4 Drawing Sheets

(56) References Cited

U.S. PATENT DOCUMENTS

| | | |
|---|---|---|
| 8,382,870 B2 | 2/2013 | Troxell et al. |
| 8,404,021 B2 | 3/2013 | Gillingham et al. |
| 8,641,792 B2 | 2/2014 | Vladaj et al. |
| 8,967,307 B2 | 3/2015 | Kim |
| 9,309,841 B2 | 4/2016 | Troxell et al. |
| 9,718,018 B2 | 8/2017 | Haynam et al. |
| 9,989,323 B2 | 6/2018 | Gauthier |
| 2004/0003578 A1* | 1/2004 | Twiefel .............. A01D 41/1252 55/385.3 |
| 2005/0069412 A1* | 3/2005 | Wikner .................. F02M 35/06 415/208.1 |
| 2005/0077389 A1* | 4/2005 | Lebeda ............... A01M 7/0014 239/338 |
| 2008/0010774 A1 | 1/2008 | Erwin et al. |
| 2011/0011259 A1* | 1/2011 | Demonie ............. B01D 46/681 95/1 |
| 2014/0117701 A1 | 5/2014 | Davis et al. |
| 2016/0167091 A1* | 6/2016 | Williams ........... B23Q 11/0042 15/316.1 |
| 2020/0406182 A1* | 12/2020 | Grieve ............... B01D 46/0005 |
| 2021/0239077 A1* | 8/2021 | Singh ....................... F01P 11/06 |
| 2022/0087106 A1* | 3/2022 | Faulring ................. B25J 9/1697 |

* cited by examiner

SYSTEM AND METHOD FOR CLEANING AN AIR INTAKE SCREEN OF A WORK VEHICLE

FIELD OF THE INVENTION

The present disclosure relates generally to work vehicles and, more particularly, to a system and method for cleaning an air intake screen of a work vehicle.

BACKGROUND OF THE INVENTION

Work vehicles, such as tractors, generally include an engine air intake system for supplying air to the engine. The air intake system is configured generate an airflow through an intake duct or stack for delivery to an air filter assembly, which cleans and filters the air prior to delivery to the engine. Additionally, an intake screen is typically supported at the inlet of the intake duct to prevent large particulates or debris from being suppled through the air intake system. However, as is generally understood, work vehicles often operate in fields and other harvesting environments in which the ambient air contains large amounts of dust, plant material and other debris. As a result, the intake screen can often become blocked or clogged with debris, thereby preventing air from flowing through the screen and impairing the operation of the air intake system.

Typically, the debris must be removed from the intake screen manually by an operator, which can be time consuming. Further, in conventional vehicles, there is no way to automatically determine whether the screen is plugged. As such, the work vehicle may be operated for a significant period of time while the screen is plugged, which may cause the engine to operate at less than ideal conditions.

Accordingly, an improved system and method for cleaning an air intake screen of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for cleaning an air intake screen of a work vehicle. The system includes an engine air intake assembly having an air intake screen through which an airflow is directed for subsequent delivery to an engine of a work vehicle. The system further includes a nozzle provided in operative association with the engine air intake assembly and directed towards the air intake screen, and a pressurized fluid source configured to supply pressurized fluid to the nozzle. The pressurized fluid received by the nozzle is expelled from the nozzle and directed through the air intake screen.

Additionally, the present subject matter is directed to a method for cleaning an air intake screen through which an airflow is directed for subsequent delivery to an engine of a work vehicle. The method includes receiving an input associated with cleaning the air intake screen. The method further includes supplying pressurized fluid from a pressurized fluid source supported on the work vehicle to a nozzle configured to direct the pressurized fluid towards the air intake screen. Additionally, the method includes expelling the pressurized fluid from the nozzle through the air intake screen to remove debris from the air intake screen.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
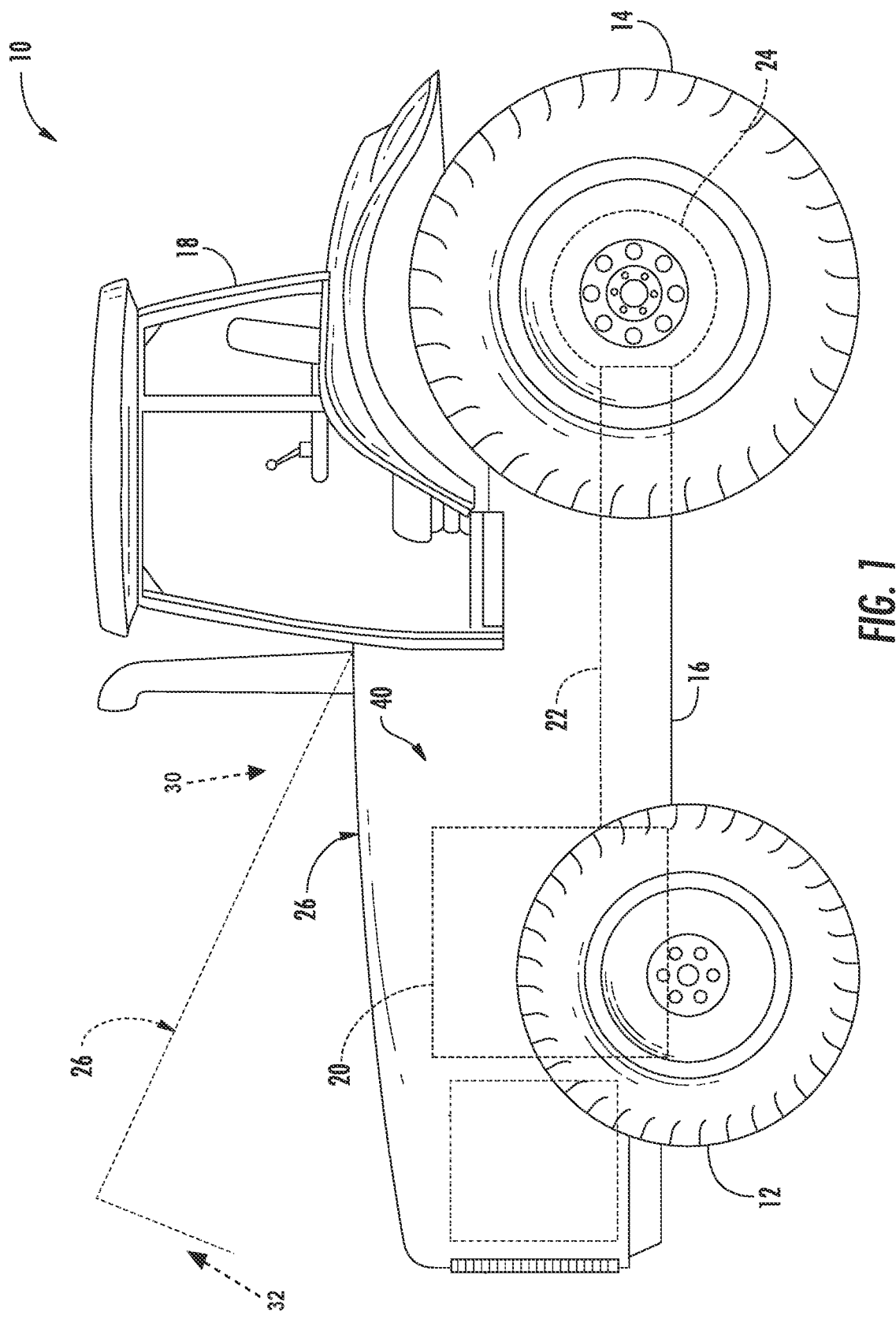
FIG. 1 illustrates a illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for cleaning an air intake screen of a work vehicle. In several embodiments, the air intake screen is configured to be positioned at an air inlet of an intake duct disposed upstream of an air intake for an engine of the work vehicle and is configured to prevent large debris from entering the intake duct. The air intake screen may become plugged with such debris, which may affect the performance of the engine. As such, systems and methods are provided herein for cleaning such air intake screens. In accordance with aspects of the present subject matter, the disclosed system may include one or more nozzles positioned relative to an air intake screen to direct pressurized fluid through the screen, thereby allowing any accumulated debris to be removed from the screen.

In one embodiment, pressurized fluid may be supplied to the nozzle(s) by controlling the operation of a valve fluidly coupled between the nozzle(s) and a pressurized fluid source, and/or by operating a compressor to provide pressurized fluid to the nozzle(s). In one embodiment, the operation of the valve and/or the compressor is controlled based at least in part on a received input indicative of debris accumulation on the screen. Such input may be received, for example, from a pressure sensor positioned within the air intake duct. As the pressure increases, the likelihood that debris has accumulated on the screen also increases. As such, the supply of pressurized fluid to the nozzle(s) may be initiated when the detected pressure exceeds a predetermined pressure threshold. Additionally, or alternatively, the input may be received from an operator of the work vehicle or from an electronic cleaning module configured to control the system to supply the pressurized fluid on a periodic basis (e.g., depending on the operating conditions of the work vehicle).

Referring now to the drawings, FIG. 1 illustrates one embodiment of a work vehicle 10 in accordance with aspects of the present subject matter. In particular, FIG. 1 illustrates a side view of the work vehicle 10. It should be appreciated that, although the work vehicle 10 illustrated herein is configured as an agricultural tractor, the work vehicle 10 may generally be configured as any suitable work vehicle known in the art, such as various other agricultural vehicles, earth-moving vehicles, road vehicles, loaders and/or the like.

As shown in FIG. 1, the work vehicle 10 includes a pair of front wheels 12, a pair or rear wheels 14, and a chassis 16 coupled to and supported by the wheels 12, 14. An operator's cab 18 may be supported by a portion of the chassis 16 and may house various control devices (not shown) for permitting an operator to control the operation of the work vehicle 10. Additionally, the work vehicle 10 may include an engine 20 and a transmission 22 mounted on the chassis 16. The transmission 22 may be operably coupled to the engine 20 and may provide variably adjusted gear ratios for transferring engine power to the wheels 12, 14 via a differential 24.

The work vehicle 10 may also include a hood 26 configured to least partially surround and/or cover the various under-hood components stored within the vehicle's engine compartment 40, such as the engine 20 and any other suitable under-hood components (e.g., hydraulic components, pneumatic components, electrical components, mechanical component(s), storage tank(s), etc.). As particularly shown in FIG. 1, the hood 26 may be configured to be pivotally coupled to a portion of the work vehicle 10 at or adjacent to its aft end 30 such that the hood 26 can be pivoted about the aft end 30 between a closed position (shown in solid lines in FIG. 1) and an opened position (shown in dashed lines in FIG. 1). Specifically, by pivoting the hood 26 upwardly such that the front end 32 of the hood 26 is moved away from the engine compartment 40, the hood 26 may be moved from its closed position to the opened position to provide access to the engine compartment 40. Similarly, by pivoting the hood 26 downwardly such that the front end 32 of the hood 26 is moved towards the engine compartment 40, the hood 26 may be moved from its opened position to the closed position to allow the hood 26 to cover the engine compartment 40.

Figure 2:
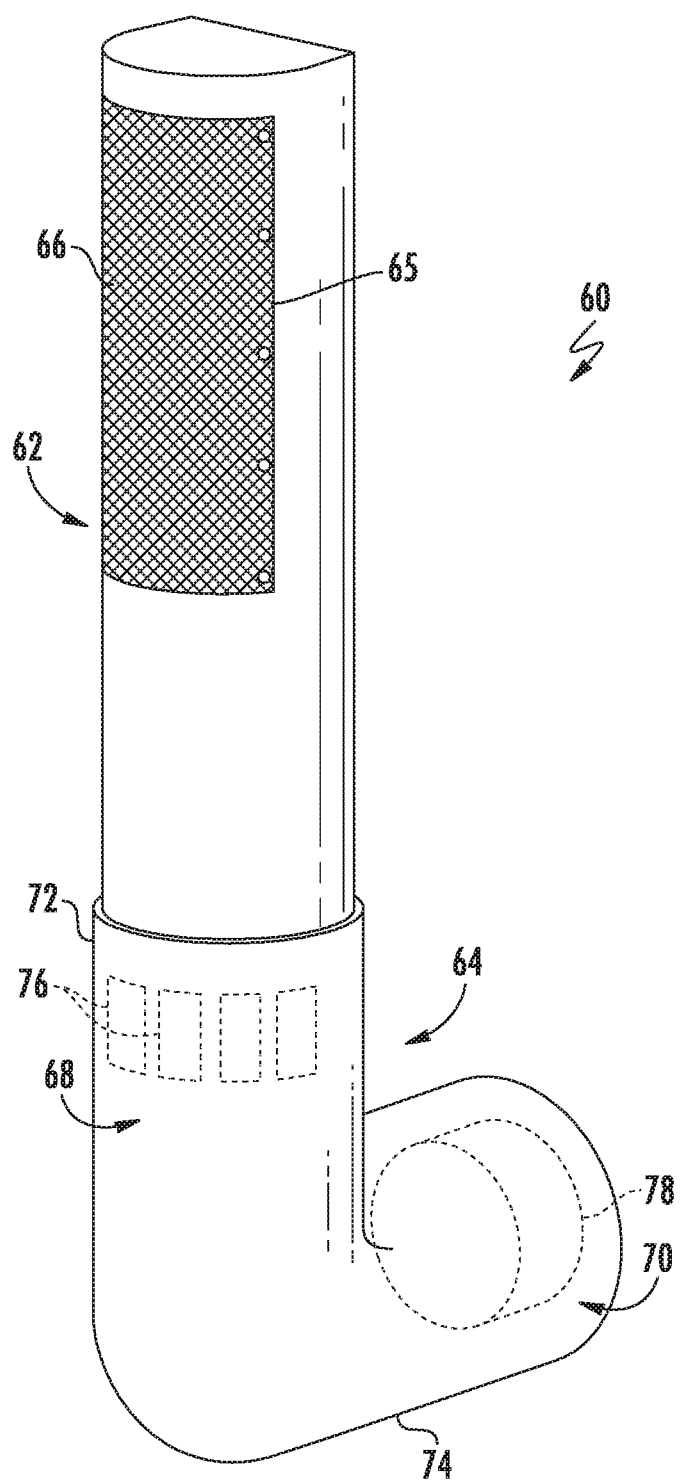
FIG. 2 illustrates a perspective view of an intake stack or duct of the work vehicle shown in FIG. 1, particularly illustrating an air intake screen covering an inlet of the duct.

Additionally, the work vehicle 10 may include an engine air intake assembly for channeling air into the engine 20. For instance, FIG. 2 illustrates a perspective view of one embodiment of an engine air intake assembly 60 suitable for use with the work vehicle 10 shown in FIG. 1 in accordance with aspects of the present subject matter. As shown in FIG. 2, the engine air intake assembly 60 may generally include an intake duct 62 and a filter assembly 64 in flow communication with the intake duct 62. The intake duct may generally be configured to receive dirty air flowing outside the work vehicle 10 and direct such dirty air into the filter assembly 64 for cleaning/filtering before delivering the cleaned air to the engine 20. Thus, in several embodiments, the intake duct 62 may generally comprise an elongated, conduit-like body defining an air inlet 65 for receiving air. Additionally, as shown in FIG. 2, an air intake screen 66 (hereafter referred to as "screen 66") may be disposed over or within the air inlet 65, thereby preventing large debris from entering the intake duct 62. As will be described in greater detail below, debris may build up on the screen 66 such that the screen 66 may become increasingly plugged or clogged over time, which may reduce the airflow flowing through the screen 66 and subsequently through the filter assembly 64 and the engine 20.

The filter assembly 64 of the air intake assembly 60 may generally be configured to receive the dirty air from the intake duct 62 and clean/filter such air for subsequent delivery to the engine 20. Thus, in several embodiments, the filter assembly 64 may include a pre-cleaner 68 and an air filter 70 disposed downstream of the pre-cleaner 68. In addition, the filter assembly 64 may include a pre-cleaner housing 72 configured to encase the pre-cleaner 68, and a filter housing 74 configured to encase the air filter 70. It should be appreciated that the pre-cleaner housing 72 and the filter housing 74 may be formed integrally with one another (e.g., by forming both housings 72, 74 as a single continuous housing) or the pre-cleaner housing 72 and the filter housing 74 may comprise separate components configured to be separately coupled to one another.

As is generally understood, the pre-cleaner 68 may be configured to remove large size debris contained within the air flowing into the filter assembly 64 via the intake duct 62. Specifically, in several embodiments, the pre-cleaner 68 may include a plurality of tubes (e.g., turbo tubes), dirt separators, and/or any other suitable pre-cleaner elements 76 configured to separate large particulates from the air via centripetal force. These large particulates may then be expelled from the filter assembly 64 via an outlet port (not shown). Additionally, the air filter 70 may generally be configured to receive the cleaned air flowing from the pre-cleaner 68 and filter such air to provide a final stage of filtering prior to delivery of the air to the engine 20. Thus, as shown in FIG. 2, the air filter 70 may generally include one or more filter elements 78 configured to catch or trap the remaining particulates contained within the cleaned air. For instance, in several embodiments, the filter element(s) 78 may be made from a fibrous, porous or mesh material that allows air to pass therethrough while catching/trapping any particulates. The cleaned/filtered air may then be directed through a suitable conduit (not shown) to the engine 20, where the air may be mixed with fuel and combusted.

Figure 3A:
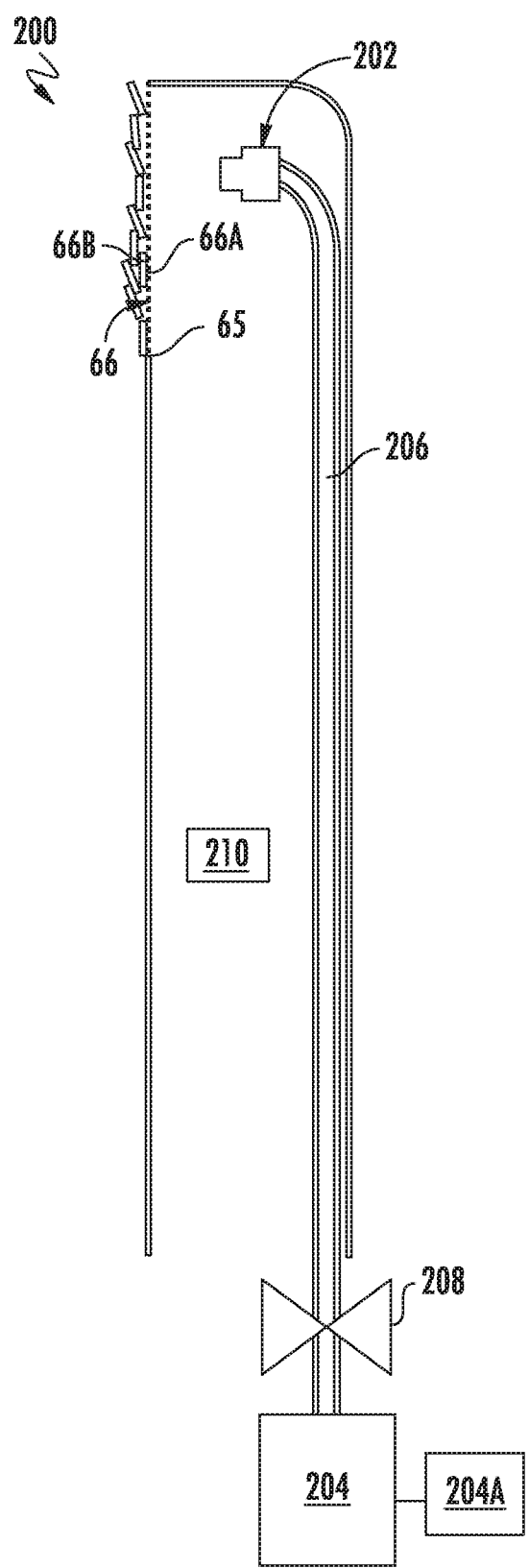
FIG. 3A illustrates a section view of the intake duct shown in FIG. 2 in accordance with aspects of the present subject matter, particularly illustrating the air intake screen in a plugged condition and one embodiment of an intake screen cleaning system positioned relative to the air intake screen.
Figure 3B:
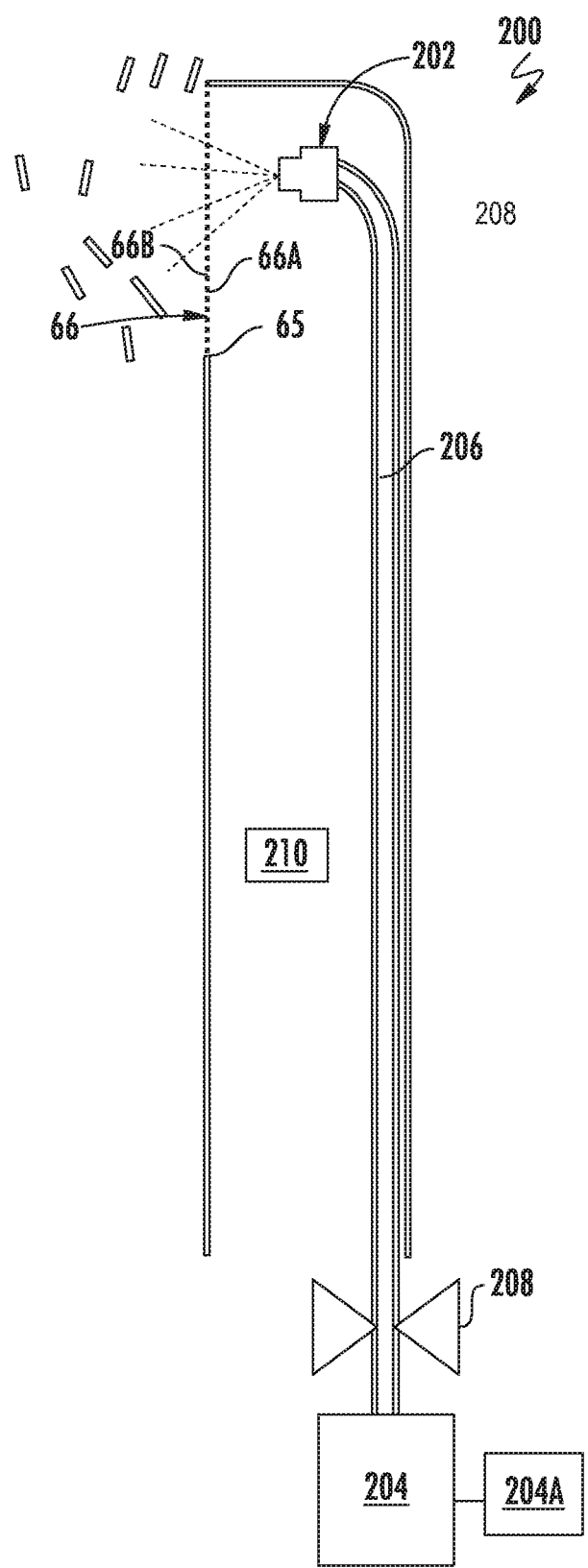
FIG. 3B illustrates another section view of the intake duct shown in FIG. 2 in accordance with aspects of the present subject matter, particularly illustrating the intake screen cleaning system being used to clean the air intake screen.

Referring now to FIGS. 3A and 3B, different views of one embodiment of a system 200 for cleaning an air intake screen of a work vehicle 10 is illustrated in accordance with aspects of the present subject matter. Specifically, FIG. 3A illustrates a section view of the intake duct shown in FIG. 2, particularly illustrating the air intake screen in a plugged condition. Additionally, FIG. 3B illustrates another section view of the intake duct shown in FIG. 2, particularly illustrating the system 200 when used to clean the air intake screen.

In general, the system 200 may be configured to supply pressurized fluid through the air intake screen 66 to dislodge or remove accumulated debris on the screen 66. In several embodiments, the system 200 includes a nozzle 202, a pressurized fluid source 204 configured to supply pressurized fluid to the nozzle 202, and a conduit 206 fluidly coupled between the nozzle 202 and the pressurized fluid source 204.

As particularly shown in FIGS. 3A and 3B, the nozzle 202 is configured to be positioned within the intake duct 62 so as to allow the nozzle 202 to direct pressurized fluid towards the screen 66. Particularly, the nozzle 202 is positioned adjacent to the screen 66, such as at a location within the intake duct directly behind the screen 66. As shown in FIGS. 3A, and 3B, the screen 66 has an inner side 66A and an outer side 66B opposite the inner side 66A, with the inner side 66A being positioned within and/or facing towards the interior of the intake duct 62. In such an embodiment, the nozzle 202 may be configured to be oriented towards the inner side 66A of the screen 66. As such, the nozzle 202 is configured to receive pressurized fluid from the pressurized fluid source 204 and expel the pressurized fluid through the screen 66 from the inner side 66A to the outer side 66B of the screen 66. While only one nozzle 202 is shown, it should be appreciated that the system 200 may have any other suitable number of nozzles, such as two or more nozzles. It should further be appreciated that the nozzle(s) 202 is sized such that the airflow into the intake duct 62 via the screen 66 is not significantly affected. Thus, the nozzle(s) 202 may be fixed relative to the screen 66 such that the screen 66 may be cleaned immediately upon detection of debris accumulation. However, in some embodiments, the nozzle(s) 202 may be movable relative to the screen 66.

In one embodiment, the pressurized fluid source 204 may generally comprise a fluid reservoir configured to contain a fluid (e.g., air), particularly a pressurized fluid (e.g., pressurized air). In some embodiments, the fluid reservoir 204 may contain enough pressurized fluid for a certain number of cleaning operations and may thus be configured to be removable from the engine compartment 40 to be refilled or replaced by an operator. However, in other embodiments, the pressurized fluid source 204 may include or may be coupled to a compressor 204A for compressing the fluid contained within the pressurized fluid source 204. In such embodiment, the pressurized fluid source 204 may function to provide pressurized fluid without requiring removal or re-filling of a reservoir. In some embodiments, the compressor 204A may be selectively operated to regulate the supply of pressurized fluid to the nozzle 202. For instance, when it is desired for pressurized fluid to be supplied to the nozzle 202, the compressor 204A may be turned on. Conversely, when pressurized fluid is no longer desired to be supplied to the nozzle 202, the compressor 204A may be turned off. It should be appreciated that while only one fluid reservoir 204 and compressor 204A are shown, any suitable number of fluid reservoirs 204 and compressors 204A may instead be used.

In some embodiments, the system 200 may further include a valve 208 fluidly coupled to the conduit 206 between the nozzle 202 and the pressurized fluid source 204. The valve 208 may be configured to regulate the supply of pressurized fluid from the pressurized fluid source 204 to the nozzle 202. For instance, when the valve 208 is closed (FIG. 3A), the pressurized fluid supplied by the pressurized fluid source 204 is prevented from travelling through the conduit 206 to the nozzle 202. Conversely, when the valve 208 is opened (FIG. 3B), pressurized fluid from the pressurized fluid source 204 may travel through the conduit 206 and the valve 208 for delivery to the nozzle 202. In one embodiment, the valve 208 is configured as a solenoid valve, such that the valve 208 may be opened or closed electronically via a controller of the disclosed system. However, it should be appreciated that the valve 208 may be configured as any suitable type of valve, such as a one-way valve, a two-way valve, a manually operated valve, a mechanically operated valve, etc.

It should additionally be appreciated that while only one valve 208 is shown, any other suitable number of valves 208 may be used. For instance, in an embodiment of the system 200 including multiple nozzles 202 supported relative to the air intake screen 66, the system 200 may have two or more valves 208 fluidly connected between the nozzles 202 and the pressurized fluid source 204 such that when at least one of the valves 208 is closed and at least one of the valves 208 is opened, the nozzles 202 associated with the closed valve(s) do not receive pressurized fluid and the nozzles 202 associated with the opened valve(s) receive pressurized fluid. Such selective activation of the nozzles 202 may be used, for example, to allow pressurized fluid to be expelled through specific areas or regions of the screen 66.

Additionally, in some embodiments, the system 200 may further include a pressure sensor 210 configured to generate data indicative of a pressure within the intake duct 62. For instance, the pressure sensor 210 may be positioned within the intake duct 62 (i.e., downstream of the screen 66 and upstream of the filter assembly 64 (FIG. 2)) such that the pressure sensor 210 can generate data indicative of an air pressure within the intake duct 62. The pressure sensor 210 may be configured as any suitable pressure sensor configured to measure air pressure. The air pressure within the intake duct 62 may be used as an indicator of debris build up on the screen 66, as will be described in greater detail below.

Figure 4:
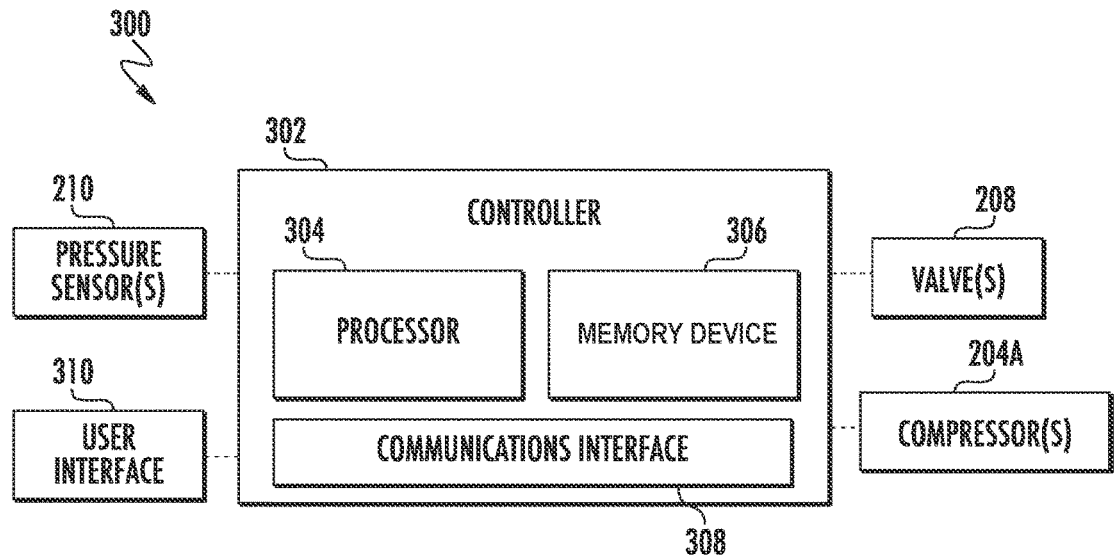
FIG. 4 illustrates a schematic view of one embodiment of a system for cleaning an air intake screen of a work vehicle in accordance with aspects of the present subject matter.

Referring now to FIG. 4, a schematic view of one embodiment of a system 300 for cleaning an air intake screen of a work vehicle is illustrated in accordance with aspects of the present subject matter. In general, the system 300 will be described herein with reference to work vehicle 10 described above with reference to FIG. 1, and the system 300 described above with reference to FIGS. 3A and 3B. However, it should be appreciated by those of ordinary skill in the art that the disclosed system 300 may generally be utilized with work vehicles and systems having any other suitable configuration.

As shown in FIG. 4, the system 300 may include a controller 302 configured to electronically control the operation of one or more components of the work vehicle 10. In general, the controller 302 may comprise any suitable processor-based device known in the art, such as a computing device or any suitable combination of computing devices. Thus, in several embodiments, the controller 302 may include one or more processor(s) 304, and associated memory device(s) 306 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 306 of the controller 302 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 306 may generally be configured to store suitable computer-readable instructions that, when implemented by the processor(s) 304, configure the controller 302 to perform various computer-implemented functions, such as one or more aspects of the methods that will be described herein. In addition, the controller 302 may also include various other suitable components, such as one or more input/output channels, a data/control bus and/or the like.

It should be appreciated that, in several embodiments, the controller 302 may correspond to an existing controller of the work vehicle 10. However, it should be appreciated that, in other embodiments, the controller 302 may instead correspond to a separate processing device. For instance, in one embodiment, the controller 302 may form all or part of a separate plug-in module that may be installed within the work vehicle 10 to allow for the disclosed system and method to be implemented without requiring additional software to be uploaded onto existing control devices of the work vehicle 10. Additionally, it should be appreciated that, in some embodiments, the controller 302 corresponds to the controller 302 described above.

In some embodiments, the controller 302 may be configured to include a communications module or interface 308 to allow for the controller 302 to communicate with any of the various other system components described herein. For instance, the controller 302 may, in several embodiments, be configured to receive data or sensor inputs from one or more sensors that are used to detect one or more parameters associated with debris accumulation relative to the air intake screen 66 of the vehicle 10. For instance, the controller 302 may be communicatively coupled to one or more pressure sensor(s) 210 via any suitable connection, such as a wired or wireless connection, to allow data associated with cleaning the air intake screen 66 to be transmitted from the sensor(s) 210 to the controller 302. Further, the controller 302 may be communicatively coupled to one or more components of the system 200, such as the compressor 204A and/or the valve 208, to allow the controller 302 to control such components 204A, 208. Additionally, the controller 302 may be communicatively coupled to a user interface 310 to allow the controller 302 to receive inputs from an operator via the user interface 310 and/or control the operation of the user interface 310.

For example, referring back to FIGS. 3A-3B, in some embodiments, an input associated with cleaning the air intake screen 66 may be received from one or more pressure sensors 210 that generate data indicative of an air pressure within the intake duct 62. Thus, in such embodiments, the controller 302 may be configured to determine the presence of debris accumulation on the screen 66 based at least in part on the data received from the sensor(s) 210. For example, the controller 302 may include one or more suitable algorithms stored within its memory 306 that, when executed by the processor 304, allow the controller 302 to compare the detected air pressure within the intake duct 62 (e.g., the air pressure determined from the data received from the pressure sensor(s) 210) to a pressure threshold(s) to determine whether debris accumulation is present on the screen 66 and/or whether the amount of debris accumulation is acceptable. For instance, the pressure threshold(s) may generally correspond to a desired air pressure (or air pressure range) within the intake duct 62. Thus, the controller 302 may determine that the air pressure within the intake duct 62 is not acceptable when the detected air pressure differs from the pressure threshold(s), such as by exceeding or falling below the relevant threshold(s). Typically, the air pressure within the intake duct 62 increases as the screen 66 accumulates more debris. Thus, the controller 302 may particularly determine that the air pressure within the intake duct 62 is not acceptable when the detected air pressure exceeds the associated pressure threshold (e.g., by a given amount).

In some embodiments, the controller 302 may be configured to determine the severity of the debris accumulation on the screen 66. For instance, the controller 302 may be configured to compare the air pressure to one or more different pressure thresholds, with each pressure threshold corresponding to the air pressure within the intake duct 62 when a certain amount of debris has accumulated on the screen 66. For example, the pressure thresholds may include a minor pressure threshold corresponding to the pressure within the intake duct 62 at or above which the screen 66 is experiencing minor debris accumulation. Similarly, the pressure threshold may include a major pressure threshold corresponding to the pressure within the intake duct 62 at or above which the screen 66 is experiencing major debris accumulation, with the major pressure threshold being higher than the minor pressure threshold. Depending on the severity of the debris accumulation (e.g., major or minor), the controller 302 may select different control actions as will be described below.

Alternatively, the controller 302 may be configured to receive an input associated with cleaning the air intake screen 66 from any other suitable source. For instance, in one embodiment, the controller 302 may be configured to receive an input associated with cleaning the air intake screen 66 from an operator of the vehicle 10 via the user interface 310. Further, in some embodiments, the controller 302 may include an electronic cleaning module (not shown) configured to run during operation of the work vehicle 10. The electronic cleaning module may be configured to monitor one or more operating parameters of the vehicle 10, such as the total operating time, the length of time since the last cleaning of the screen 66, the field conditions of the field (e.g., wind speed, soil moisture, etc.) in which the vehicle 10 is operating, a distance traveled, and/or the like, and generate and transmit a message to the controller 302 associated with cleaning the air intake screen 66 when one or more of the operating parameters of the vehicle 10 differ from predetermined values or thresholds. For instance, the controller 302 may receive an input associated with cleaning the screen 66 from the electronic cleaning module when the total operating time of the vehicle 10 exceeds a predetermined operating time, when the length of time since the last screen cleaning exceeds a predetermined length of time, when the wind speed exceeds a wind speed threshold, when the soil moisture falls below a wind speed threshold, and/or the like.

The controller 302 may be configured to initiate a cleaning operation for cleaning the air intake screen 66 based on the receipt of an input associated with cleaning the screen 66. For instance, the controller 302 may be configured to control the operation of the valve(s) 208 and/or the compressor(s) 204A to supply pressurized fluid from the pressurized fluid source 204 to the nozzle(s) 202. As indicated above, the controller 302 may be configured to open the valve(s) 208 upon receipt of the input associated with cleaning the screen 66 to allow the pressurized fluid from the pressurized fluid source 204 to be supplied through the conduit 206 and valve 208 to the nozzle(s) 202. Additionally, or alternatively, the controller 302 may be configured to operate the compressor(s) 204A to supply and/or pressurize the fluid within the pressurized fluid source 204 such that the pressurized fluid is supplied through the conduit 206 to the nozzle(s) 102. In some embodiments, the controller 302 may initiate the cleaning operation depending on the severity of the debris accumulation. For instance, in some embodiments, the controller 302 may only initiate the cleaning operation if the screen 66 is experiencing major debris accumulation.

As discussed above, the nozzle(s) 202 may be configured to direct the pressurized fluid received from the pressurized fluid source 204 towards the screen 66. Thus, when the pressurized fluid is received by the nozzle(s) 202, the nozzle(s) 202 may expel the pressurized fluid through the screen 66 (e.g., from the inner side 66A to the outer side 66B) to remove debris from the screen 66.

In some embodiments, the controller 302 may further be configured to cease the supply of pressurized fluid from the pressurized fluid source 204. For instance, in one embodiment, the controller 302 may include one or more suitable algorithms stored within its memory 306 that, when executed by the processor 304, allow the controller 302 to compare the detected air pressure within the intake duct 62 to the pressure threshold to determine whether debris accumulation is still present on the screen 66. Thus, the controller 302 may continue to compare the detected air pressure within the intake duct 62 and determine that the debris is no longer present when the air pressure within the intake duct 62 is equal to or falls below the pressure threshold. After determining that debris is no longer accumulated on the screen 66, the controller 302 may control the valve(s) 208 to close and/or shut off the compressor(s) 204A to discontinue the supply of pressurized fluid from the pressurized fluid source 204 to the nozzle(s) 202.

Alternatively, in some embodiments, the controller 302 may be configured to cease the supply of pressurized fluid from the pressurized fluid source 204 after a period of time has elapsed after initiating the supply of pressurized fluid from the pressurized fluid source 204. In some embodiments, the period of time is selected based at least in part on the severity of the debris accumulation at the initiation of the cleaning operation (e.g., determined using the minor and major thresholds described above). For instance, in some embodiments, when the screen 66 has major debris accumulation detected at the start of the cleaning operation, the period of time may be longer than if only minor debris accumulation was detected at the start of the cleaning operation. Additionally, the controller 302 may be configured to cease the supply of pressurized fluid from the pressurized fluid source 204 upon receiving an input from an operator (e.g., via the user interface 310) indicative of the screen 66 being sufficiently clean.

Moreover, in some embodiments, the controller 302 may be configured to indicate to an operator the presence of debris on the screen 66. For example, the communications module 308 may allow the controller 302 to communicate with the user interface 310, which may, for instance, have a display device configured to display information to an operator. In one embodiment, the controller 302 may generate a notification indicating to an operator the presence of debris accumulation on the screen 66. For example, the controller 302 may generate a notification indicating the presence of debris accumulation when debris accumulation is still present after pressurized fluid from the pressurized fluid source 204 has been directed through the screen 66. However, it should be appreciated that the controller 302 may instead be communicatively coupled to any number of other indicators, such as lights, alarms, and/or the like to indicate the debris accumulation to the operator.

Figure 5:
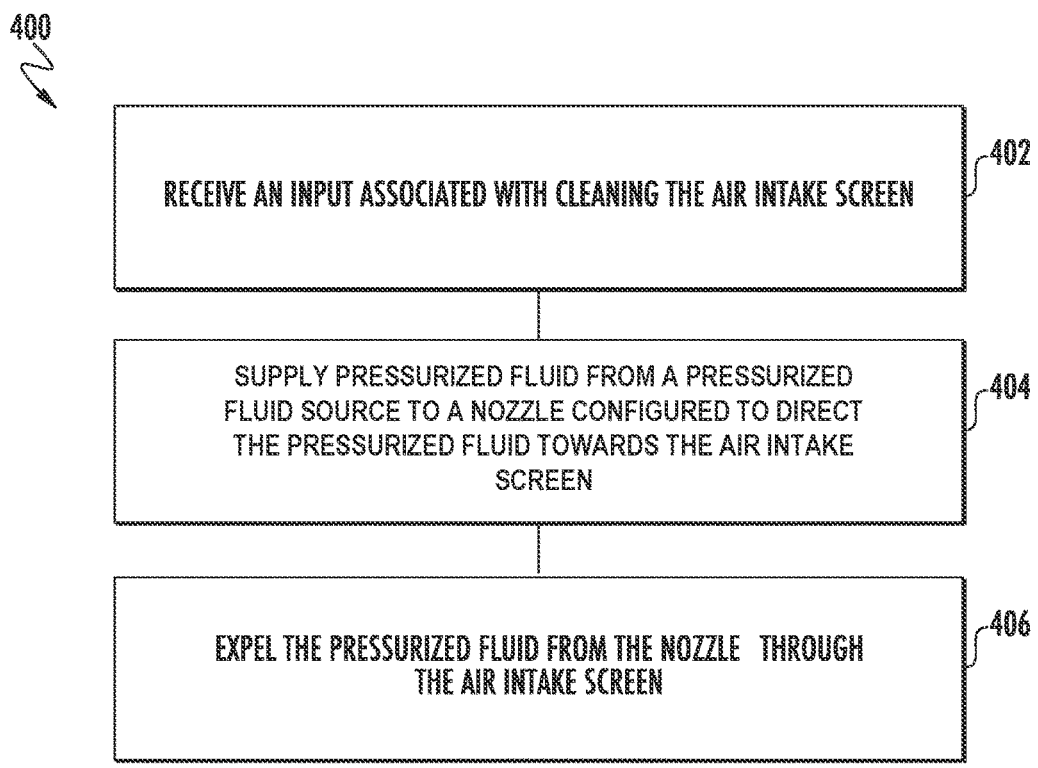
FIG. 5 illustrates a method for cleaning an air intake screen of a work vehicle in accordance with aspects of the present subject matter.

Referring now to FIG. 5, a flow diagram of one embodiment of a method 400 for cleaning an air intake screen of a work vehicle is illustrated in accordance with aspects of the present subject matter. In general, the method 400 will be described herein with reference to the work vehicle 10 shown in FIG. 1, as well as the various system components shown in FIGS. 2-4. However, it should be appreciated that the disclosed method 400 may be implemented with work vehicles having any other suitable configurations and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 5, at (402), the method 400 may include receiving an input associated with cleaning the air intake screen. For instance, as indicated above, the sensors 110 may generate data indicative of the pressure within the intake duct 62. When the pressure within the intake duct 62 exceeds a pressure threshold(s) associated with excessive debris accumulation on the screen 66, the screen 66 needs to be cleaned. Alternatively, or additionally, an input may be received from the operator of the vehicle 10 and/or an electronic cleaning module indicating that the screen 66 needs to be cleaned.

Further, at (404), the method 400 may include supplying pressurized fluid from a pressurized fluid source supported on the work vehicle to a nozzle configured to direct the pressurized fluid towards the air intake screen. For instance, as described above, the valve 208 may be opened and/or the compressor 204A may be turned on to allow pressurized fluid to be supplied to the nozzle(s) 202.

Additionally, at (406), the method 400 may include expelling the pressurized fluid from the nozzle through the air intake screen. For instance, as described above, he pressurized fluid supplied to the nozzle(s) 202 from the pressurized fluid source 204 may be expelled from the nozzle(s) 202 and through the screen 66 from the inner side 66A towards the outer side 66B. When debris is present on the outer side 66B of the screen 66, the debris is removed from the screen 66 as the pressurized fluid flows through the screen 66.

It is to be understood that, in several embodiments, the steps of the method 400 may be performed by the controller 302 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 302 described herein, such as the method 400, is implemented in software code or instructions which are tangibly stored on a tangible computer readable medium. The controller 302 loads the software code or instructions via a direct interface with the computer readable medium or via a wired and/or wireless network. Upon loading and executing such software code or instructions by the controller 302, the controller 302 may perform any of the functionality of the controller 302 described herein, including any steps of the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for cleaning an air intake screen of a work vehicle, the system comprising:
   an engine air intake assembly including an air intake screen through which an airflow is directed for subsequent delivery into an engine of a work vehicle;
   a nozzle provided in operative association with the engine air intake assembly and directed towards the air intake screen; and
   a pressurized fluid source configured to supply pressurized fluid to the nozzle,
   wherein the pressurized fluid received by the nozzle is expelled from the nozzle and directed through the air intake screen.

2. The system of claim 1, further comprising a valve fluidly coupled between the nozzle and the pressurized fluid source, the valve being configured to regulate the supply of the pressurized fluid from the pressurized fluid source to the nozzle.

3. The system of claim 2, further comprising a controller communicatively coupled to the valve, the controller being configured to selectively open and close the valve to regulate the supply of the pressurized fluid from the pressurized fluid source to the nozzle.

4. The system of claim 3, further comprising a pressure sensor configured to generate pressure data indicative of an air pressure within an intake duct of the engine air intake assembly, the intake duct defining an air inlet relative to which the air intake screen is supported,
   wherein the controller is communicatively coupled to the pressure sensor, the controller being configured to open the valve when the air pressure within the intake duct exceeds a pressure threshold to allow the pressurized fluid from the pressurized fluid source to be supplied to the nozzle and expelled from the nozzle towards the air intake screen.

5. The system of claim 4, wherein the pressure sensor is positioned within a portion of the intake duct to allow the pressure sensor to detect the air pressure within the intake duct.

6. The system of claim 3, wherein the controller is communicatively coupled to a user interface, the controller being configured to open the valve upon receipt of an input from the user interface.

7. The system of claim 1, wherein the engine air intake assembly comprises an intake duct and an air filter assembly downstream of the intake duct, the intake duct defining an air inlet relative to which the air intake screen is supported for receiving the airflow within the intake duct.

8. The system of claim 7, wherein the pressurized fluid is directed through the air intake screen from an inner side of the air intake screen to an outer side of the air intake screen opposite the inner side, the inner side of the air intake screen facing towards an interior of the intake duct.

9. The system of claim 1, wherein the pressurized fluid is supplied through the nozzle to remove debris from the air intake screen.

10. The system of claim 1, wherein the nozzle is fixed relative to the air intake screen.

11. A method for cleaning an air intake screen of an engine intake assembly of a work vehicle, the method comprising:
    receiving an input associated with cleaning the air intake screen through which an airflow is directable for subsequent delivery into the engine of the work vehicle;
    supplying pressurized fluid from a pressurized fluid source supported on the work vehicle to a nozzle configured to direct the pressurized fluid towards the air intake screen; and
    expelling the pressurized fluid from the nozzle through the air intake screen to remove debris from the air intake screen.

12. The method of claim 11, wherein the input is received from a pressure sensor configured to generate pressure data indicative of an air pressure within an intake duct, the intake duct defining an air inlet relative to which the air intake screen is supported.

13. The method of claim 12, further comprising comparing the air pressure within the intake duct to a pressure threshold,
    wherein supplying the pressurized fluid from the pressurized fluid source comprises supplying the pressurized fluid from the pressurized fluid source when the air pressure within the intake duct exceeds the pressure threshold.

14. The method of claim 13, further comprising ceasing the supply of the pressurized fluid from the pressurized fluid source when the air pressure within the intake duct is equal to or falls below the pressure threshold.

15. The method of claim 12, wherein the pressure sensor is positioned within the intake duct to allow the pressure sensor to detect the air pressure within the intake duct.

16. The method of claim 12, wherein the air intake screen has an inner side facing an interior of the intake duct and an outer side opposite the inner side, the nozzle being positioned within the intake duct such that the pressurized fluid discharged from the nozzle is directed from the inner side to the outer side of the of the air intake screen.

17. The method of claim 11, wherein the input is received from an operator via a user interface.

18. The method of claim 11, wherein supplying the pressurized fluid from the pressurized fluid source comprises opening a valve fluidly coupled between the nozzle and the pressurized fluid source.

19. The method of claim 11, further comprising ceasing the supply of the pressurized fluid from the pressurized fluid source after a predetermined period of time.

20. The system of claim 1, wherein the engine air intake assembly further includes:
- a pre-cleaner downstream of the air intake screen such that the pre-cleaner is configured to receive the airflow filtered by the air intake screen; and
- an air filter downstream of the pre-cleaner such that the air filter is configured to receive the airflow filtered by the pre-cleaner,
- wherein the airflow filtered by the air filter is directed for subsequent delivery into the engine of the work vehicle.

\* \* \* \* \*